United States Patent [19]

Shibata et al.

[11] Patent Number: 4,725,859

[45] Date of Patent: Feb. 16, 1988

[54] LIQUID JET RECORDING HEAD

[75] Inventors: Makoto Shibata, Hiratsuka; Hiroto Matsuda, Ebina; Masami Ikeda, Machida; Hiroto Takahashi, Hiratsuka, all of Japan

[73] Assignee: Canon Kabushiki Kaisha, Tokyo, Japan

[21] Appl. No.: 8,071

[22] Filed: Jan. 27, 1987

Related U.S. Application Data

[63] Continuation of Ser. No. 674,661, Nov. 26, 1984, abandoned.

[30] Foreign Application Priority Data

Nov. 30, 1983 [JP] Japan ................................ 58-224265

[51] Int. Cl.[4] ................................................ G01D 15/18

[52] U.S. Cl. ................................... 346/140 R; 338/309

[58] Field of Search ........................... 346/140, 76 PH; 338/309, 327

[56] References Cited

U.S. PATENT DOCUMENTS

| | | | |
|---|---|---|---|
| 3,984,844 | 10/1976 | Tanno | 346/76 PH |
| 4,259,564 | 3/1981 | Ohkubo | 346/76 PH X |
| 4,335,389 | 6/1982 | Shirato | 346/140 |
| 4,339,762 | 7/1982 | Shirato | 346/140 |
| 4,345,262 | 8/1982 | Shirato | 346/140 |
| 4,438,191 | 3/1984 | Cloutier | 346/140 X |
| 4,450,457 | 5/1984 | Miyachi | 346/140 |

*Primary Examiner*—Joseph W. Hartary

*Attorney, Agent, or Firm*—Fitzpatrick, Cella, Harper & Scinto

[57] ABSTRACT

A liquid jet recording head comprises an electro-thermal transducer having a heat-generating resistance layer provided on a substrate, a pair of electrodes connected electrically to said heat-generating resistance layer and disposed with a gap so as to confront each other and a heat-generating section provided between these electrodes; a liquid discharging section corresponding to said electro-thermal transducer having an orifice provided for forming flying liquid droplets and a liquid pathway connected to said orifice and having a heat acting portion where heat energy for forming liquid droplets acts on liquid as a part of its constitution; and a liquid chamber for storing said liquid to be supplied to said liquid pathway, which comprises forming said electrodes thinner in the vicinity of at least the portion in contact with said heat-generating section as compared with other portions of the electrodes.

11 Claims, 8 Drawing Figures

LIQUID JET RECORDING HEAD

This application is a continuation of application Ser. No. 674,661 filed Nov. 26, 1984, now abandoned.

BACKGROUND OF THE INVENTION

1. Field of the Invention

This invention relates to a liquid jet recording head which performs recording by jetting a liquid to form flying liquid droplets.

2. Description of the Prior Art

Ink jet recording methods (liquid jet recording methods) are recently attracting attention for such advantages that generation of noise during recording is negligibly small, high speed recording is possible and recording can be done on so-called plain paper without need of the special treatment of fixing.

Among such methods, the liquid jet recording technique disclosed in, for example, Japanese Laid-open patent application No. 51837/1979, Deutsche Offenlegungsschrift (DOLS) No. 24843064 has a specific feature different from other liquid jet recording methods in that the driving force for discharging liquid droplets is obtained by permitting heat energy to act on a liquid.

More specifically, according to the recording method disclosed in the above patent specifications, liquid which has received action of heat energy undergoes a change in state accompanied with an abrupt increase of volume, and through the acting force based on the change in state is discharged liquid through the orifice at the tip end of the recording head section to be formed into flying liquid droplets, which liquid droplets are attached onto a material to be recorded, thereby effecting recording thereon.

In particular, the liquid jet recording method disclosed in DOLS No. 2843064 is not only applicable very effectively for the so-called drop-on demand recording method, but also can easily be embodied into a recording head in which the recording head portion is made into a high density multi-orifice or full line type, thus being capable of giving images of high resolution and high quality at high speed.

The recording head section of a device that can carry out the above-mentioned method has a liquid discharging portion having an orifice for discharging liquid and a liquid pathway, which is connected to the orifice and has a heat acting portion at which thermal energy acts on liquid for discharging liquid droplets, and an electro-thermal transducer as a means for generating thermal energy.

The electro-thermal transducer has a pair of electrodes and a heat-generating resistance layer which is connected to these electrodes and has a region for heat generation (heat-generating section) between these electrodes.

A typical example exhibiting the structure of such a liquid jet recording head is shown in FIG. 1A, FIG. 1B and FIG. 1C. FIG. 1A is the front view of a liquid jet recording head as seen from the orifice side, FIG. 1B is a partial sectional view of FIG. 1A when cut along the broken line X-Y and FIG. 1C is a plan view of the substrate.

The recording head 100 has a structure having orifices 104 and liquid discharging sections 105 formed by bonding a grooved plate 103 provided with a certain number of grooves of certain width and depth at a predetermined line density to a substrate 102 provided on its surface with an electro-thermal transducer 101 so as to cover the surface of the substrate 102. The recording head shown in the drawing has a plural number of orifices 104. Of course, the present invention is not limited to such an embodiment, but also a recording head with a single orifice is included in the category of the present invention.

The liquid discharging section 105 has an orifice 104 for discharging liquid at its terminal end and a heat acting portion 106 where thermal energy generated from an electro-thermal transducer 101 acts on liquid to generate a bubble and cause an abrupt change in state through expansion and shrinkage of its volume.

The heat acting portion 106 is positioned above the heat-generating section 107 of the electro-thermal transducer 101 and has a heat acting face 108 in contact with the liquid at the heat-generating section 107 as its bottom face.

The heat-generating section 107 is constituted of a lower layer 109, a heat-generating resistance layer 110 provided on the lower layer 109 and a first protective layer 111 provided on the heat-generating resistance layer 110. The heat-generating resistance layer 110 is provided on its surface with electrodes 113 and 114 for current flow through the layer 110. The electrode 113 is common to the heat-generating portions of the respective liquid discharging sections, and the electrode 114 is a selective electrode for selecting the heat generating portion of each liquid discharging section for heat generating and is provided along the liquid pathway of the liquid discharging section.

The first protective layer 111 has the function of separating the heat-generating resistance layer 110 from the liquid filling the liquid pathway of the liquid discharging section for protection of the heat-generating resistance layer 110 chemically or physically against the liquid employed at the heat-generating section 107, and also has the protective function for the heat generating resistance layer to prevent short-circuit through the liquid between the electrodes 113 and 114. The first protective layer 111 also serves to prevent electrical leaks between adjacent electrodes. In particular, prevention of electrical leaks between the respective selective electrodes or prevention of electric corrosion, which will occur by flow of electric current between the electrode under each liquid pathway and the liquid which may happen to come into contact with each other for some cause, is important and for this purpose the first protective layer 111 having such a protective function is provided at least on the electrode existing under the liquid pathway.

Further, the liquid pathway provided at each liquid discharging section is connected upstream thereof to the common liquid chamber (not shown) for storage of the liquid to be supplied to said liquid pathway, and the electrode connected to the electro-thermal transducer provided at each liquid discharging section is generally provided for convenience in designing so that it may pass beneath the aforesaid common liquid chamber on the side upstraem of the heat acting portion. Accordingly, it is generally practiced to provide the upper layer as described above even at this portion in order to prevent contact between the electrode and the liquid.

As described above, on the heat-generating resistance layer 110, there is provided an upper layer 111 for protecting the layer chemically and physically from the liquid employed and also for preventing short-circuits between the electrodes through the liquid. The material for constituting the upper layer 111 should preferably be an organic resin with respect to coating characteristic, but it cannot be used for the heat-generating section due to inferior heat resistance. Accordingly, improvement of heat resistance has been attempted by making the film thicker in forming films of inorganic oxides, metal oxides, etc. which are relatively excellent in thermal conductivity and heat resistance, according to the vapor deposition method, the sputtering method, CVD method, etc.

However, although heat resistance can be improved as the upper layer 111 is made thicker, the thermal energy generated in the heat-generating resistance layer 110 will be lost in the upper layer 111, whereby the heat energy acting on liquid is reduced. Accordingly, for ensuing sufficient energy acting on liquid, the amount of heat generation must be increased, which in turn will result in acceleration of deterioration of the heat-generating resistance layer.

On the other hand, the thickness of the electrodes is determined so as to ensure reliability taking wiring resistance value and other conditions into consideration. The upper layer must have a thickness sufficient to cover the step difference created between the heat-generating section and the section where electrodes are provided. Accordingly, if the thickness of the electrodes is larger, the upper layer must necessarily be thicker, and the upper layer covering over the terminal portions of the electrodes tend to be thinner as shown in FIG. 1B. Such a thin portion may suffer from generation of cracks during energy generation, thus creating a problem in one aspect of durability.

SUMMARY OF THE INVENTION

The present invention has been accomplished in view of the various points as mentioned above and a primary object of the present invention is to provide a liquid jet recording head which is excellent in overall durability in frequently repeated uses or continuous uses for a long time and can maintain stably the initial good liquid droplet forming characteristic for a long term.

Another object of the present invention is to provide a liquid jet recording head which is highly reliable in manufacturing working.

Further, another object of the present invention is to provide an ink jet recording head which is high in yield also when made into a multi-orifice type.

According to the present invention, there is provided a liquid jet recording head, comprising an electro-thermal transducer having a heat-generating resistance layer provided on a substrate, a pair of electrodes connected electrically to said heat-generating resistance layer and disposed with a gap so as to confront each other and a heat-generating section provided between these electrodes; a liquid discharging section corresponding to said electrothermal transducer having an orifice provided for forming flying liquid droplets and a liquid pathway connected to said orifice and having a heat acting portion where heat energy for forming liquid droplets acts on liquid as a part of its constitution; and a liquid chamber for storing said liquid to be supplied to said liquid pathway, which comprises forming said electrodes thinner in the vicinity of at least the portion in contact with said heat-generating section as compared with other portions of the electrodes.

DESCRIPTION OF THE PREFERRED EMBODIMENTS

Referring not to the drawings, the liquid jet recording head of the present invention is to be described in detail.

Figure 1A:
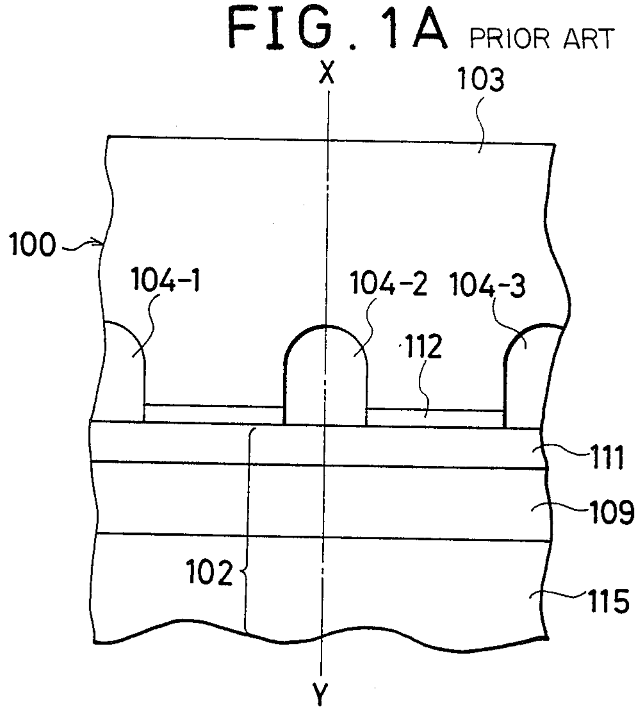
FIG. 1A PRIOR ART
FIGS. 1A, 1B and 1C are each presented for illustration of the constitution of a liquid jet recording head of the prior art, FIG. 1A showing a schematic partial front view, FIG. 1B a sectional view partially cut taken along the broken line X-Y in FIG. 1A and FIG. 1C a schematic plan view of a substrate.
Figure 1B:
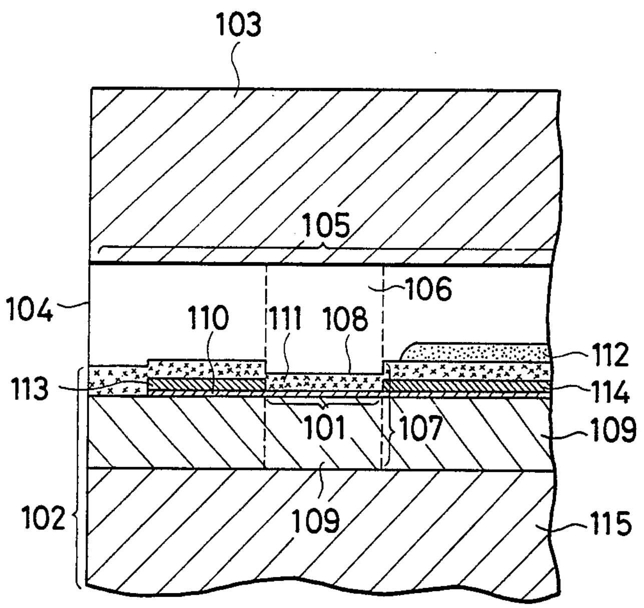
FIG. 1B PRIOR ART
Figure 1C:
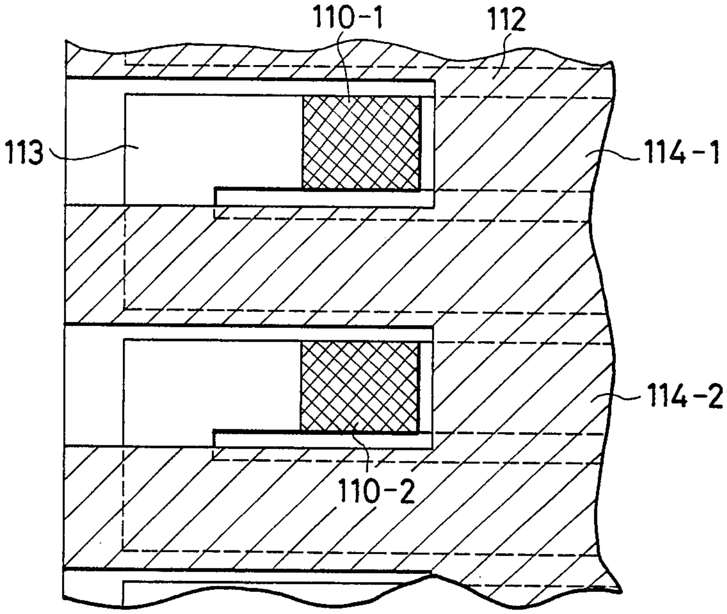
FIG. 1C PRIOR ART
Figure 2A:
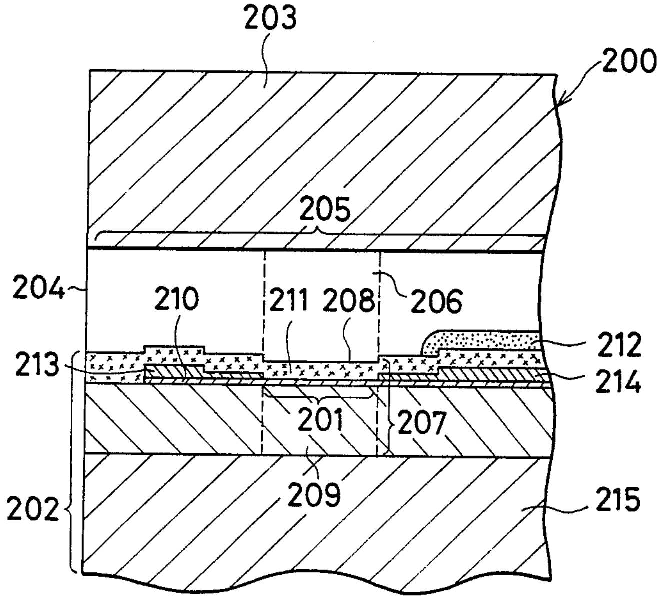
FIGS. 2A and 2B are each presented for illustration of the constitution of a liquid recording head according to the present invention, FIG. 2A showing a partial sectional view corresponding to FIG. 1B and FIG. 2B a schematic plan view of a bubble jet substrate c to FIG. 1C.

FIG. 2A shows a preferred embodiment of the liquid jet recording head corresponding to FIG. 1B. The electrodes 213 and 214 are formed so as to be thinner in the vicinity of the portion in contact with the heat-generating section 207, taking into account considerations as to resistance value increase and reliability.

The liquid jet recording head 200 shown in the drawings is constituted at its main part of a substrate for liquid jet recording utilizing heat for liquid discharging provided with a desired number of an electro-thermal transducer 201 and a grooved plate 203 having a desired number of grooves provided corresponding to said electro-thermal transducers.

The bubble jet substrate 202 (hereinafter abbreviated as BJ substrate) and the grooved plate 203 are bonded to each other at predetermined positions with an adhesive or other means, whereby a liquid pathway 205 is formed by the portion of the substrate on which the electro-thermal transducer 201 is provided and the groove portion of the grooved plate 203, said liquid pathway 205 having a heat acting portion 206 as a part of its constitution.

The BJ substrate 202 has a support 215 constituted of silicon, glass, ceramics, etc., a lower layer 209 constituted of $SiO_2$, etc. provided on said support 215, a heat-generating resistance layer 210, a common electrode 213 and a selection electrode 214 provided along the liquid pathway 205 on both sides of the upper surface of the heat-generating resistance layer, a first protective layer 211 which covers the portion of the heat generating resistance layer which is not covered with electrodes and the portions of electrodes 213 and 214 and further a second protective layer 212 on the upper surface of the first protective layer above the selection electrode 214.

The electro-thermal transducer 201 has a heat-generating section 207 as its main part, and the heat-generating section 207 is constituted of laminates provided successively from the side of the support 215, namely a power layer 209, a heat-generating resistance layer 210, and the first protective layer 211, the surface of the first protective layer 211 (heat acting face) being contacted directly with the liquid filling the liquid pathway 205.

On the other hand, the surface of the selection electrode 214 is covered mostly with an upper layer comprising the first protective layer 211 and the second protective layer 212 laminated in this order from the electrode side, said upper layer being also provided in such a form at the bottom portion of the common liquid chamber provided upstream of the liquid pathway 205.

As shown in FIG. 2A, since the electrodes 213 and 214 are formed to be thinner in the vicinity of the portion in contact with the heat-generating section 207 as compared with other portions, the step difference between the electrodes 213, 214 and the surface of the heat-generating resistance layer 210 and the step difference between the portion where electrodes are formed thinly and the portion where not formed thinly are both small, and therefore the first protective layer can be provided sufficiently only if it can cover such a small step difference, whereby no thin portion will be formed at the stepped portion.

Figure 2B:
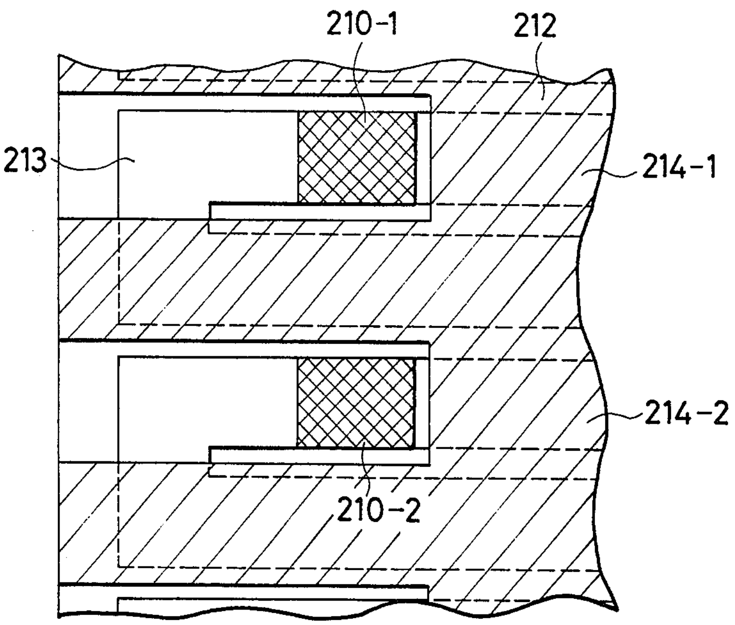

In the case of the liquid jet recording head 200 shown in FIGS. 2A and 2B, the upper layer of the common electrode 213 has a structure having no second protective layer 212 provided thereon. The present invention is not limited to such an embodiment, but a second layer may also be provided similarly as the upper layer of the selection electrode 214. However, in the case of the liquid jet recording head as shown in FIGS. 2A and 2B, since the step difference between the surface position of the liquid pathway 205 on the orifice side relative to the heat-acting surface 208 in each liquid discharging section and the surface position of the heat-acting surface 208 can be small, the bottom surface of the liquid pathway is relatively smooth as compared with the case when a second protective layer is provided also on the common electrode 213, and therefore the liquid can flow smoothly to enable bubble formation stably. However, if the step difference between the surface position on the orifice side relative to the heat acting surface 208 and the surface position of the heat acting surface 208 is substantially negligibly smaller as compared with the distance between the upper surface of the liquid pathway 205 and the heat acting surface 208, stability of liquid droplet formation will not significantly be affected thereby. Accordingly, within such a range, it is either possible to provide or not to provide a second protective layer on the upper layer of the common electrode on the orifice side relative to the heat-acting surface 208.

The material for constituting the first protective layer 211 may suitably be an inorganic insulating material excellent in thermal conductivity and heat resistance, for example, inorganic oxides such as $SiO_2$, etc.; transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide and the like; metal oxides such as aluminum oxide, calcium oxide, strontium oxide, barium oxide, silicon oxide and complexes thereof; high resistivity nitrodes such as silicon nitride, aluminum nitride, boron nitride, tantalum nitride, etc. and complexes of these oxides and nitrides; further thin film materials such as semiconductors of amorphous silicon, amorphous selenium, etc. which have low resistance as bulk but can be made to have high resistance during the manufacturing steps such as by the sputtering method, the CVD method, the vapor deposition method, the gas phase reaction method, the liquid coating method and others.

The second layer 212 is constituted of an organic insulating material excellent in prevention of liquid penetration and liquid resistance and it is further desired to have such physical properties as (1) good film forming property, (2) close structure with few pinholes, (3) to be not swollen by or dissolved in the ink employed, (4) good insulating property when fabricated into film and (5) high heat resistance. Such organic materials may include the following resins, for example, silicon resin, fluorine resin, aromatic polyamide, addition polymerization type polyimide, polybenzimidazole, metal chelate polymer, titanic acid ester, epoxy resin, phthalic acid resin, thermosetting phenol resin, p-vinyl phenol resin, Zirox resin, triazine resin, BT resin (triazine resin and bismaleimide addition-polymerized resin) and others. Other than these, it is also possible to form the second layer 212 by vapor deposition of a polyxylylene resin or derivatives thereof.

Further, the second protective layer 212 can also be formed by film formation according to the plasma polymerization with the use of various organic monomers, including, for example, thiourea, thioacetamide, vinyl ferrocene, 1,3,5-trichlorobenzene, chlorobenzene, styrene, ferrocene, pyrroline, naphthalene, pentamethylbenzene, nitrotoluene, acrylonitrile, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzeneselenol, tetrafluoroethylene, ethylene, N-nitrosodiphenylamine, acetylene, 1,2,4-trichlorobenzene, propane, etc.

However, if it is desired to prepare a high density multiorifice type recording head, an organic material different from those as mentioned above which can very easily be subjected to minute lithographic working may desirably be complyed as the material for forming the second layer 212. Examples of such organic materials may include a polyimidoisoindoloqunazoline dione (trade name: PIQ, produced by Hitachi Kasei Co.), a polyimide resin (trade name: PYRALIN, produced by Du Pont), a cyclized polybutadiene (trade name JSR-CBR, CBR-M901 produced by Japan Synthetic Rubber Co.), Photonith (trade name produced by Toray Co.), and other photosensitive polyimide resins as preferable ones.

It is also possible to provide a third protective layer 216 as the outermost layer, as shown in FIGS. 1–5. The principal role of the third layer is to impart liquid resistance and reinforcement of mechanical strength. The third layer is provided as the outermost surface substantially all over the surface of the BJ substrate which may possibly be brought into contact with the liquid at the regions such as the liquid pathway 205 and the common liquid chamber, and it is constituted of a material which is tenacious, relatively excellent in mechanical strength and can be closely contacted with and adhered to the first layer 211 and the second layer 212, for example, a metal material such as Ta when the layer 211 is constituted of $SiO_2$. Thus, by providing the third layer constituted of an inorganic material, which is relatively tenacious with sufficient mechanical strength, such as a metal, on the surface layer of the substrate, particularly at the heat acting face 208, the shock from cavitation action generated on liquid discharging can sufficiently be absorbed to give the effect of elongating to a great extent the life of the electro-thermal transducer 201.

As the material which can form the third layer, in addition to Ta as mentioned above, there may be employed the elements of the group IIIa of the periodic table such as Sc, Y and others, the elements of the group IVa such as Ti, Zr, Hf and others the elements the group Va such as V, Nb and others, the elements of the group VIa such as Cr, Mo, W and others, the elemnts of the group VIII such as Fe, Co, Ni and others; alloys of the above metals such as Ti-Ni, Ta-W, Ta-Mo-Ni, Ni-Cr, Fe-Co, Ti-W, Fe-Ti, Fe-Ni, Fe-Cr, Fe-Ni-Cr and others; borides of the above metals such as Ti-B, Ta-B, Hf-B, W-B and others; carbides of the above metals such as Ti-C, Zr-C, V-C, Ta-C, Mo-C, Ni-C and others; silicides of the above metals such as Mo-Si, W-Si, Ta-Si and others; nitrides of the above metals such as T-N, Nb-N, Ta-N and others; and so on. The third layer can be formed by use of these materials according a vapor deposition method, a sputtering method, a CVD method, etc. The third protective layer can be a single layer as described or alternatively some of these can of course be combined. Also, for the third protective layer, in plase of a single layer as mentioned above, such a layer may be combined with the material for the first layer.

The lower layer 209 is provided as a layer for controlling the flow of heat generated primarily from the heat-generating section 207 toward the side of the support 215. Choice of the material and designing of the layer thickness for the lower layer are made so that, when heat energy is permitted to act on liquid at the heat acting section 206, the heat generated from the heat-generating section 207 may be controlled to flow in greater amount, which when electric current to the electricity-heat converter 201 is turned off, the heat remaining in the heat generating section 207 may flow rapidly toward the side of the support 215. Examples of the materials constituting the lower layer 209 may include $SiO_2$ as previously mentioned and inorganic materials, typically metal oxides such as zirconium oxide, tantalum oxide, magnesium oxide, aluminum oxide and the like.

For the material constituting the heat-generating resistance layer 210, it is possible to employ most of the materials which can generate heat as desired by a flow of electric current.

More specifically, such materials may include, for example, tantalum nitride, nickel-chromium, silver-palladium alloy, silicon semiconductors, or metals such as hafnium, lanthanum, zirconium, titanium, tantalum, tungsten, molybdenum, niobium, chromium, vanadium, etc., alloys thereof and borides thereof as preferable ones.

Among the materials constituting the heat-generating resistance layer 210, especially a metal boride may be mentioned as excellent one, and above all hafnium boride has the best characteristic, and following this compound there are zirconium boride, lanthanum boride, vanadium boride and niobium boride with better characteristic in the order mentioned.

The heat-generating resistance layer 210 can be formed by use of the materials as mentioned above according to the method such as electron beam vapor deposition or sputtering.

As the material constituting the electrodes 213 and 214, most of electrode materials conventionally employed may be used effectively. For example, there may be employed metals such as Al, Ag, Au, Pt, Cu, etc. As the method for forming the electrodes, it is possible to employ the method in which the electrodes are first formed thickly by vapor deposition, etc. and thereafter etching the portions to be formed thinly by the dry or wet method, the method in which electrodes are first formed thinly and layer formation is conducted again with the portion to be formed thinly being masked, and the method according to lift-off. The thickness may be 30 to 3000 Å at the thinner portion, while 1000 Å to 1 μm at the portion having the thickness in conventional practice. It is preferred to make the thickness smaller at least at the area within 0.5 μm from the end portion of the heat acting surface.

As the material constituting the constituent member for the common liquid chamber provided on the side upstream of the grooved plate 203 and the heat acting section 206, most of the materials are effectively available, so long as they are substantially free from the influence on shape by the heat during working of the recording head or under environment during use and capable of being worked by a minute precise working process easily with its face precision being easily attained, and further can be worked so that the liquid may flow smoothly through the pathways formed by such workings.

Typical examples of such materials may include ceramics, glass, metal, plastic or silicon wafer as preferable ones. In particular, glass or silicon wafer is one of preferable materials, since it can easily be worked and has appropriate heat resistance, thermal expansion coefficient and thermal conductivity. In order to prevent the outside of the orifice from coming therearound of the liquid leaked, it is preferred to apply on the outer surface around the orifice 204 water repelling treatment in the case of an aqueous liquid and oil repelling treatment in the case of a non-aqueous liquid.

The orifice 204 may be formed by sequential process of plastering light-sensitive resin on the substrate 202, forming patterns according to photolighography and further plastering a ceiling plate thereon.

Figure 3:
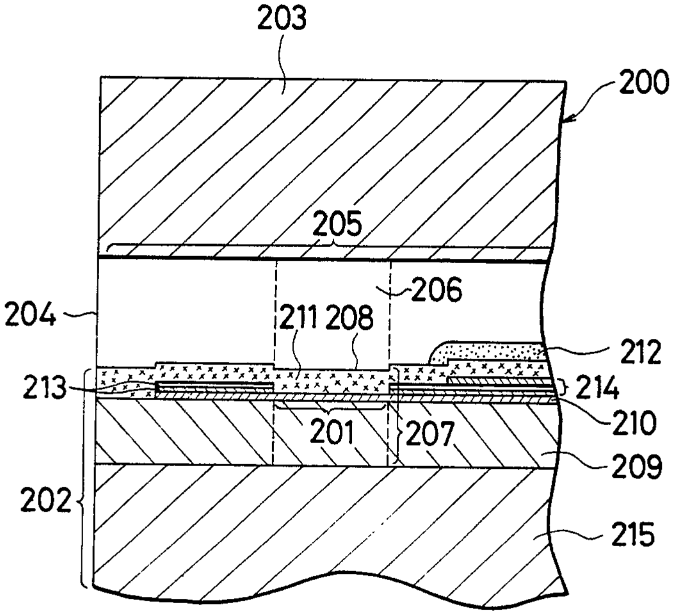
FIG. 3 and FIG. 4 each is a partial sectional view corresponding to FIG. 1B for showing other embodiments of the present invention.
Figure 4:
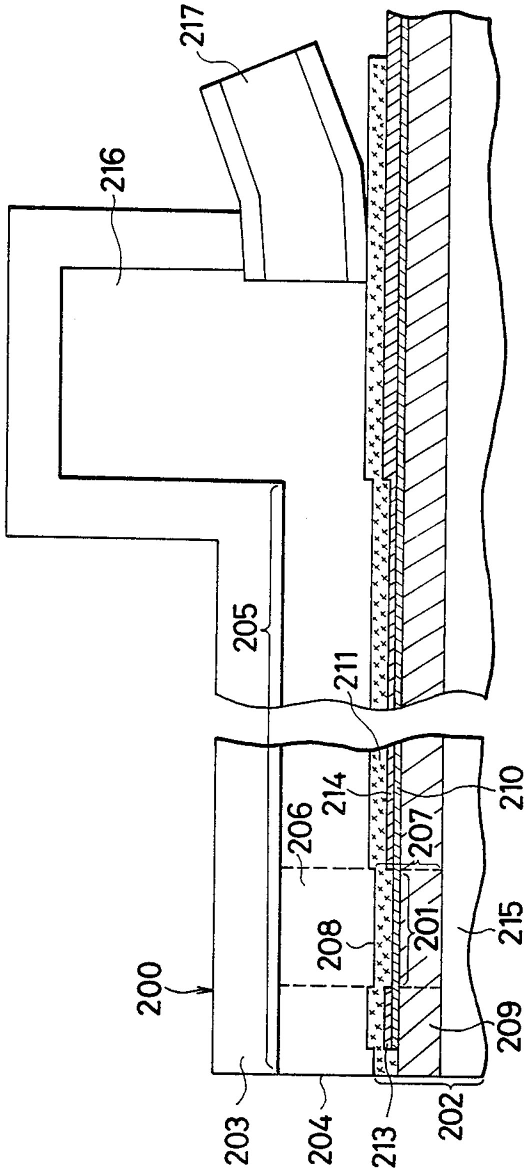
Figure 5:
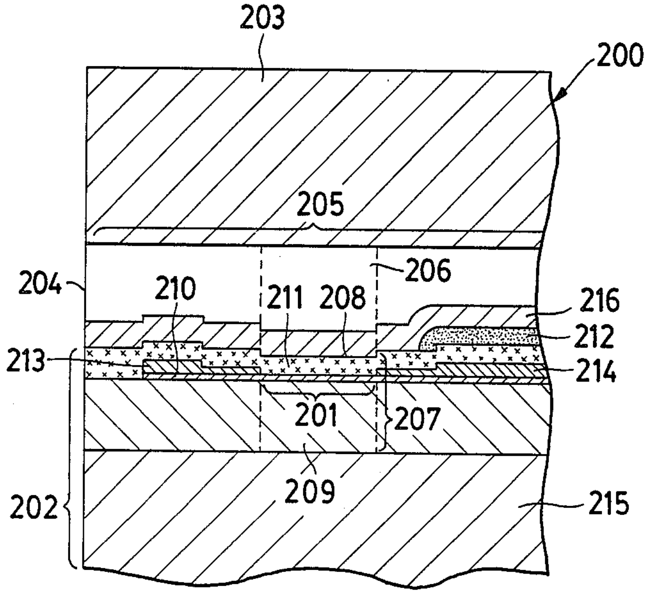
FIG. 5 is a partial sectional view showing yet another embodiment of the invention.

FIG. 3 and FIG. 4 show other embodiments of the present invention, both of FIG. 3 and FIG. 4 corresponding to FIG. 1B.

In the embodiment shown in FIG. 3, the portions thinly formed of the electrodes 213 and 214 are made to have a double-layer structure, with the upper layer being made an etching resistant layer, so as to effect more easily etching of the electrode further formed thereon to desired size and shape. Without making the thin portions of the electrode a double-layer structure, selective etching of only the upper layer may also be possible by constituting the thin portion and the not-thin portion of different kinds of materials, by selecting a material with etching resistance for the former, and a material which can relatively etched for the latter.

In the embodiment shown in FIG. 4, all the portions of the electrodes formed beneath the liquid pathway 205 are formed thinly. In this embodiment, formation of the second protective layer can be omitted to reduce the number of working steps. Even in such a constitution, the electrodes can be made to have a multi-layer structure.

The present invention is now described by referring to Example.

EXAMPLE

The liquid jet recording head as shown in FIG. 2 was prepared according to the following procedure.

A Si wafer was thermally oxidized to be formed into a $SiO_2$ film with a thickness of 5 μm to provide a substrate. On the substrate was formed by sputtering a heat generating resistance layer of $HfB_2$ to a thickness of 1500 Å, followed by successive deposition of Ti layer of 50 Å and Al layer of 5000 Å according to electron beam vapor deposition.

By way of the photolithographic steps, the pattern as shown in FIG. 2B was formed and the size of the heat acting face was found to be 30 μm in width and 150 μm in length, with the resistance being 150 ohm, including the resistance of the electrodes.

Next, the electrodes within 1 μm from the end portion of the heat acting face were made to a thickness of 2500 Å by dray etching.

As the next step, as the first protective layer 211, over the whole surface of the substrate, $SiO_2$ was laminated by the Magnetron type high rate sputtering to a thickness of 2.0 μm. The thickness of the first protective layer was 2.0 μm on the support where there is no heat-generating resistance layer and electrode, and 1.8 μm on the heat-generating resistance layer and electrodes, thus exhibiting good step coverage characteristic. Subsequently, Photonith (trade name produced by Toray Co.) was prepared as the second protective layer 212 on the hatched portion in FIG. 2B according to photolithography to prepare a BJ substrate.

Then, on this BJ substrate was adhered a grooved glass plate as determined. That is to say, as shown in FIG. 2A, a grooved glass plate (groove size: width 50 μm×depth 50 μm×length 2 mm) for forming ink inlet pathways and heat acting portion is adhered onto the BJ substrate.

The thus prepared recording head was found to be improved markedly in step coverage characteristic at the stepped portion of electrodes, and also very small in increase of resistance value in wiring, to give the result that it is excellent in overall durability during frequent repeated uses or continuous use for a long term and good liquid droplet forming characteristics at the initial stage can be maintained stably over a long term.

Also, it is rendered possible to provide liquid jet recording heads with high reliablity in the manufacturing workings, and further to provide liquid jet recording heads with high production yield even when made into multi-orifices.

What we claim is:

1. A liquid jet recording head, comprising an electro-thermal transducer having a heat-generating resistance layer on a surface of a substrate and a pair of electrodes connected electrically to said heat-generating resistance layer and disposed with a gap so as to confront each other to form a heat-generating section between said electrodes; a liquid discharging section corresponding to said electro-thermal transducer having an orifice for forming liquid droplets and a liquid pathway connected to said orifice and having a heat acting portion in which heat energy for forming liquid droplets acts on liquid in said liquid pathway; and a liquid chamber for storing said liquid to be supplied to said liquid pathway, wherein the upper surface of the electrodes is of steplike shape so that said electrodes, at least in the vicinity of the portion in contact with said heat-generating section, are thinner in the direction substantially normal to said surface of said substrate as compared with other portions of said electrodes.

2. A liquid jet recording head according to claim 1, wherein a protective layer is provided on the electrodes.

3. A liquid jet recording head according to claim 2, wherein said protective layer includes a plurality of layers.

4. A liquid jet recording head according to claim 3, wherein the outermost protective layer is a metal layer.

5. A liquid jet recording head according to claim 2, wherein said protective layer includes a resin.

6. A liquid jet recording head according to claim 2, wherein said protective layer is formed by plasma polymerization of an organic monomer.

7. A liquid jet recording head according to claim 2, wherein the protective layer is constituted of polyimidoisoindoloquinazolinedione.

8. A liquid jet recording heat according to claim 2, wherein the protective layer is constituted of a photosensitive polyimide resin.

9. A liquid jet recording head according to claim 1, wherein a protective layer is provided on said heat-generating resistance layer of said heat-generating section.

10. A liquid jet recording head according to claim 9, wherein said protective layer includes a plurality of layers.

11. A liquid jet recording head according to claim 10, wherein the outermost protective layer is a metal layer.

* * * * *

UNITED STATES PATENT AND TRADEMARK OFFICE
CERTIFICATE OF CORRECTION

PATENT NO. : 4,725,859

DATED : February 16, 1988

INVENTOR(S) : MAKOTO SHIBATA, ET AL.

It is certified that error appears in the above-identified patent and that said Letters Patent is hereby corrected as shown below:

COLUMN 1

Line 20, "(DOLS) No. 24843064" should read --(DOLS) No. 2843064--.
Line 39, "drop-on demand" should read --drop-on-demand--.
Line 42, "full line" should --full-line--.

COLUMN 2

Line 61, "upstraem" should read --upstream--.

COLUMN 3

Line 17, "ensuing" should read --ensuring--.
Line 22, "reliability" should read --reliability,--.
Line 31, "tend" should read --tends--.
Line 34, "one" should read --the--.

COLUMN 4

Line 13, "c" should read --corresponding--.
Line 14, "and" should be deleted.
Line 17, "invention." should read --invention; and--.
Line 23, "not" should read --now--.

COLUMN 6

Line 39, "complyed" should read --employed--.
Line 41, "polyimidoisoindoloqunazoline dione" should read --polyimidoisoindoloquinazolinedione--.
Line 50, "FIGS. 1-5." should read --FIG. 5.--.

UNITED STATES PATENT AND TRADEMARK OFFICE
CERTIFICATE OF CORRECTION

PATENT NO. : 4,725,859

DATED : February 16, 1988

INVENTOR(S) : MAKOTO SHIBATA, ET AL.

It is certified that error appears in the above-identified patent and that said Letters Patent is hereby corrected as shown below:

COLUMN 7

Line 1, "elongating" should read --lengthening--.
Line 7, "others" should read --others,--.
Line 8, "elements" should read --elements of--.
Line 9, "elemnts" should read --elements--.
Line 19, "according" should read --according to--.
Line 24, "plase" should read --place--.

COLUMN 8

Line 41, "photolighography" should read --photolithography--.
Line 58, "etched" should read --be etched--.
Line 68, "Example" should read --this Example--.

UNITED STATES PATENT AND TRADEMARK OFFICE
CERTIFICATE OF CORRECTION

PATENT NO. : 4,725,859

DATED : February 16, 1988

INVENTOR(S) : MAKOTO SHIBATA, ET AL.

It is certified that error appears in the above-identified patent and that said Letters Patent is hereby corrected as shown below:

COLUMN 10

Line 12, "forming liquid" should read --forming flying liquid--.
Line 39, "heat" should read --head--.

Signed and Sealed this

Ninth Day of August, 1988

Attest:

DONALD J. QUIGG

*Attesting Officer* *Commissioner of Patents and Trademarks*